UNITED STATES PATENT OFFICE.

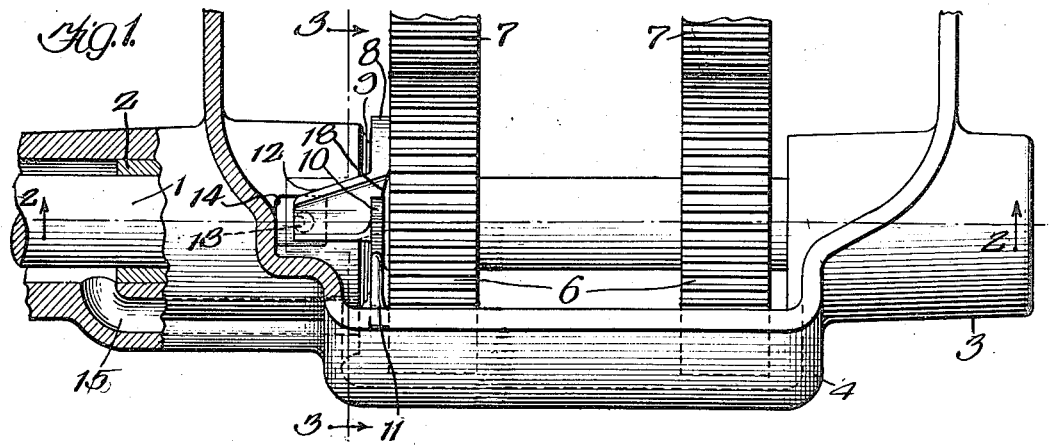
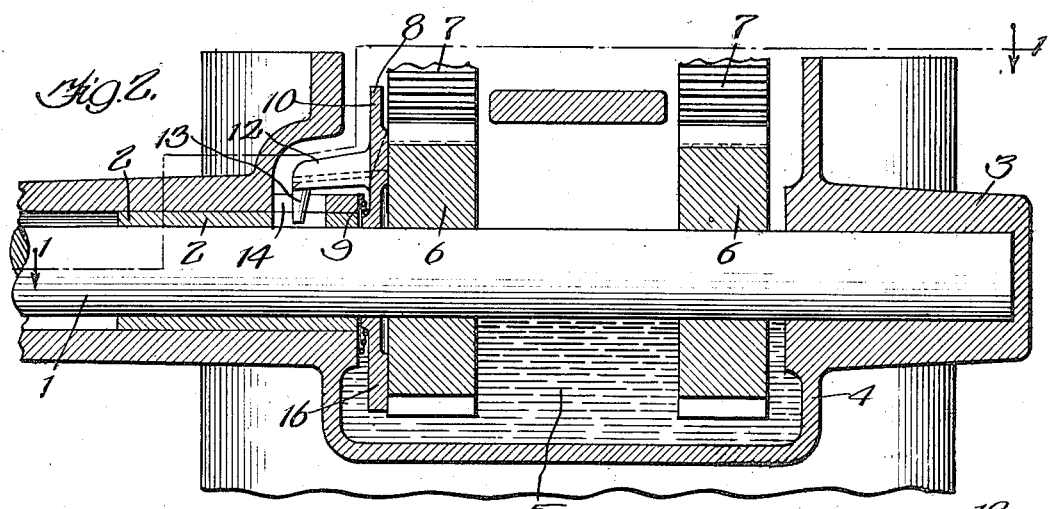
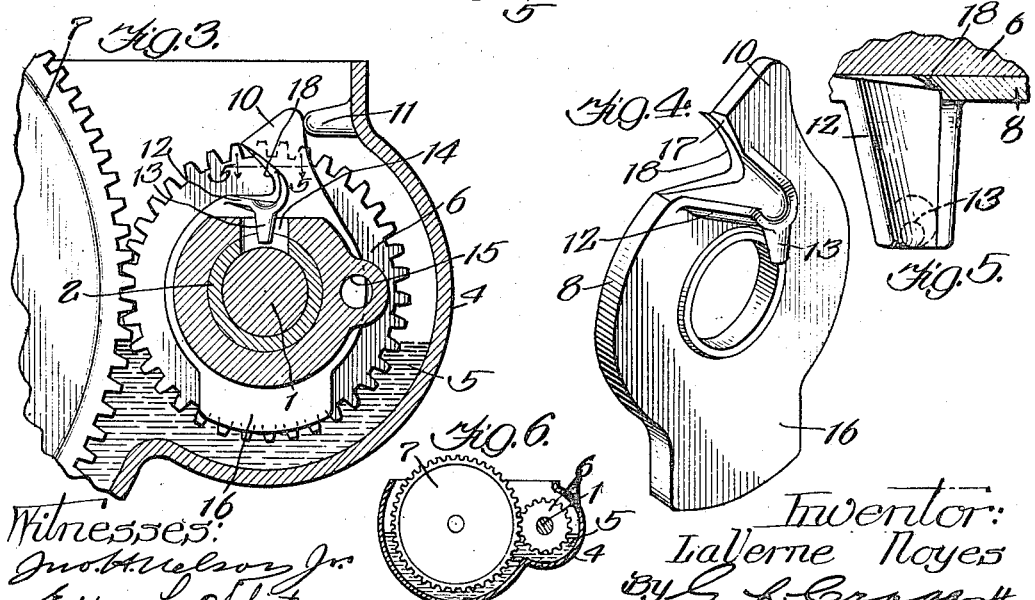

LA VERNE NOYES, OF CHICAGO, ILLINOIS, ASSIGNOR TO AERMOTOR COMPANY, OF CHICAGO, ILLINOIS, A CORPORATION OF ILLINOIS.

LUBRICATING MECHANISM.

1,143,307.   Specification of Letters Patent.   Patented June 15, 1915.

Application filed August 27, 1914. Serial No. 858,895.

*To all whom it may concern:*

Be it known that I, LA VERNE NOYES, citizen of the United States, residing at Chicago, in the county of Cook and State of Illinois, have invented a certain new and useful Improvement in Lubricating Mechanism, of which the following is a full, clear, concise, and exact description, reference being had to the accompanying drawings, forming a part of this specification.

My invention relates to lubricating mechanism and is of particular service when embodied in the structure of a wind mill, though the invention is not to be limited to this adaptation.

In practicing my invention a disk is mounted to take part in the transfer of lubricant from a lubricant containing basin, an upper portion of the face of the disk being engaged by the inlet end of a substantially stationary trough whose outlet end communicates with a bearing that is to be lubricated, and which bearing is preferably arranged to return the lubricant to the lubricant containing basin. I have employed, for the aforesaid disk, a pinion carried upon the shaft of the wind wheel of a wind mill and which pinion meshes with a gear wheel which is in direct connection with a pitman that operates the mill load, such as a pump. I have caused intimate contact to be maintained between the trough and the upper portion of the face of the pinion by means of a spring and have caused a scraping portion of this trough to face the place of gear meshing in order that the oil upwardly conveyed by the teeth of both gear wheels may, in large part, be conveyed to the trough, the larger gear wheel being arranged to dip into the lubricant contained in the basin. In order to insure uniform engagement of the trough with the pinion this trough is constituted of an enlargement on a non-rotating washer.

I will explain my invention more fully by reference to the accompanying drawing showing the preferred embodiment thereof and in which—

Figure 1 is a sectional plan view generally taken on line 1 1 of Fig. 2; Fig. 2 is a sectional elevation generally taken on line 2 2 of Fig. 1; Fig. 3 is a sectional view on line 3 3 of Fig. 1; Fig. 4 is a perspective view of the trough carrying washer; Fig. 5 is a sectional view on line 5 5 of Fig. 3; and Fig. 6 is a view on a much smaller scale illustrating, more fully, the gearing housing.

Like parts are indicated by similar characters of reference throughout the different figures.

The mechanism shown is included within the structure of a wind mill and may readily be adapted to the mechanism illustrated in United States Patent No. 1,101,211, dated June 23, 1914. In such a wind mill structure the wind wheel shaft 1 is provided with bearings 2 and 3 carried by a gear housing 4 which is made imperforate, particularly at its lower portion, so as to contain lubricating oil illustrated at 5 in its lower portion. The shaft 1 carries pinions or small spur gear wheels 6 which are in driving mesh engagement with larger gear wheels 7 that are operatively connected with a suitable load operating pitman which does not need to be illustrated. A washer 8 is pressed against the left face of the left pinion 6 by a conical coil spring 9 which tends to distend axially of the shaft 1 to effect the application of its pressure against the washer 8, the base of the spring 9 resting against the housing 4 at the right end of the bearing 2. The washer 8 is circular at its right and left hand sides but is enlarged at its upper portion 10 beyond the periphery of the adjacent pinion 6 so as to engage a lug 11 carried by the housing whereby the washer is withheld from rotation. The washer is cut away beneath the overhanging extension 10 and within the circle of its side portions, so as there to constitute an entrance to an oil conducting trough 12 which terminates at its outer end in a leader 13 provided for directing the oil into an opening 14 in the bearing 2. The oil conveyed through the trough 12 is directed to the opening 14 by the leader 13 and finds its way directly to the shaft 1 at the opening 14 and works endwise of the shaft in both directions, oil that works beyond the bearing 2 to the left ultimately finding a return to the housing interior through the return passage 15. It is desirable to limit a portion of the left hand pinion 6 to engagement with the right hand border of the trough 12 as much as possible, on which account the washer 8 has a downwardly extending projection 16 which bears against the associate pinion 6 outside of the circle of the sides of the washer.

It will be observed that the entrance to the trough 12 is formed by an opening or large notch 17 in the washer, this notch facing the place where the adjacent gear wheels 6 and 7 mesh, the washer being sharpened as indicated at 18 (Fig. 5) where the washer engages the adjacent pinion 6 and the sides of the teeth thereof so as to scrape all the oil from this portion of the associate pinion 6 and direct it to the trough extension 12 of the washer. The meshing wheels 6 and 7 turn in the direction indicated by the arrows in Fig. 3 whereby the teeth of these wheels coöperate to elevate a portion of the oil which afterward finds its way through the ends of the valleys between the teeth of wheel 6 whereby a part of the oil flowing from between the teeth upon the left hand face of this wheel 6 is scraped off by the scraping edge 18. The oil flows from the scraping edge 18 into the trough 12, the oil flowing downwardly through this trough upon the leader 13 that directs it into the opening 14 for the purpose previously set forth.

While I have herein shown and particularly described the preferred embodiment of my invention I do not wish to be limited to the precise details of construction shown as changes may readily be made without departing from the spirit of my invention but

Having thus described my invention I claim as new and desire to secure by Letters Patent the following claims:

1. Lubricating mechanism including a basin for containing lubricant; a disk taking part in transferring lubricant from the basin; a washer bearing against a face of the disk and co-axial with the disk; a bearing to which lubricant is to be conveyed; and a trough carried by the washer and in scraping engagement therewith at one end of the trough, the other end of the trough being positioned to discharge lubricant into the bearing.

2. Lubricating mechanism including a basin for containing lubricant; a disk taking part in transferring lubricant from the basin; a washer bearing against a face of the disk and co-axial with the disk; a bearing to which lubricant is to be conveyed; a trough carried by the washer and in scraping engagement therewith at one end of the trough, the other end of the trough being positioned to discharge lubricant into the bearing; and a spring for pressing the washer against the disk.

3. Lubricating mechanism including a basin for containing lubricant; a disk taking part in transferring lubricant from the basin; a washer bearing against a face of the disk and co-axial with the disk; a bearing to which lubricant is to be conveyed; a trough carried by the washer and in scraping engagement therewith at one end of the trough, the other end of the trough being positioned to discharge lubricant into the bearing; and a spring for pressing the washer against the disk, the washer having an enlargement projecting beyond a portion of the area of the disk which is scraped by the trough, through which enlargement pressure of the spring is exerted.

4. Lubricating mechanism including a basin for containing lubricant; a pair of meshed gear wheels one of which dips within the lubricant in the basin; a bearing to which lubricant is to be conveyed; and a trough in scraping engagement with a face of the other gear wheel and oppositely facing the direction of rotation of the wheel that it scrapes, this trough being positioned to convey lubricant to said bearing.

5. Lubricating mechanism including a basin for containing lubricant; a pair of meshed spur gear wheels one of which dips within the lubricant in the basin; a bearing to which lubricant is to be conveyed; and a trough in scraping engagement with a face of the other gear wheel and oppositely facing the direction of rotation of the wheel that it scrapes, this trough being positioned to convey lubricant to said bearing and being in scraping engagement with the sides of the teeth of the wheel it faces.

In witness whereof, I hereunto subscribe my name this 19th day of August A. D., 1914.

LA VERNE NOYES.

Witnesses:
FREDERICK L. DOLE,
D. R. SCHOLES.